United States Patent [19]
Taylor

[11] 4,369,870
[45] Jan. 25, 1983

[54] AUTOMATIC GRAIN DISTRIBUTOR
[75] Inventor: Edmund P. Taylor, Greencastle, Ind.
[73] Assignee: Bryant-Poff, Inc., Coatesville, Ind.
[21] Appl. No.: 186,350
[22] Filed: Sep. 11, 1980
[51] Int. Cl.³ .............................................. B65G 11/12
[52] U.S. Cl. ..................................................... 193/23
[58] Field of Search ..................... 193/23, 15; 222/533; 74/436, 53

[56] References Cited
U.S. PATENT DOCUMENTS

| | | | |
|---|---|---|---|
| 3,585,017 | 6/1971 | Trudeau | 193/23 X |
| 3,827,312 | 8/1974 | Bristol | 74/436 |
| 4,159,053 | 6/1979 | Taylor | 193/23 |

Primary Examiner—John J. Love
Assistant Examiner—Gene A. Church
Attorney, Agent, or Firm—Woodard, Weikart, Emhardt & Naughton

[57] ABSTRACT

An automatic grain distributor for interfacing between a grain elevator discharge fitting and a plurality of remote delivery locations includes a grain distributor housing which is coupled by a grain inlet to the elevator discharging fitting and an inner spout which is disposed within the grain distributor housing and couples the grain inlet to a selected one of the grain delivery apertures. Movement of this inner spout from one grain delivery aperture to another grain delivery aperture is accomplished by means of an electromechanical mechanism which includes an eccentric plate and follower as well as a geneva-style mechanism. A gearmotor and clutch arrangement are coupled to the eccentric plate so as to provide a single revolution to the plate with each energizing command to the motor. As the eccentric plate makes a single revolution, it drives a follower which raises the inner spout to a slightly elevated position above its corresponding grain delivery aperture. While in this raised position, the geneva-style mechanism then comes into operation and indexes the raised inner spout to the next (adjacent) grain delivery aperture. As operation of the geneva-style mechanism terminates, the eccentric plate and its follower move back into their original position thereby allowing the raised inner spout to be lowered over this adjacent grain delivery aperture.

12 Claims, 7 Drawing Figures

AUTOMATIC GRAIN DISTRIBUTOR

BACKGROUND OF THE INVENTION

This invention relates in general to distributor mechanisms for transferring material from one location to one of a plurality of remote locations and in particular to grain distributors of the type frequently used with bucket elevators.

The transfer of particulate material from a delivery location to a selected remote use or storage location involves the need to couple a conduit or similar device between the two locations and some means to move this conduit to different ones of the remote locations. One example of particulate material is grain and transfer of grain often involves a bucket elevator.

Bucket elevators for grain frequently employ a pickup location near the base of a vertical column and a discharge location near the top of this vertical column. The vertical column includes an enclosed pair of chutes through which the grain cups (buckets) and their conveyor belt travel. Pulley arrangements are located at each end for establishing a continuous loop of travel. The velocity of this conveyor results in a flinging action of the grain from the cups as these cups pass over the top pulley and begin their downward travel. The grain discharged from the cups is directed into a funnel-shaped discharging fitting and from this location the grain flows into a grain distributor.

Grain distributors are employed in order to control the delivery of grain from the elevator to selected ones of various remote locations such as to bins and dryers. These types of distributors typically include a manifold plate which has a series of apertures and for each aperture there is an individual flow spout coupling a corresponding one of these apertures to a different bin or dryer. Within the distributor is a inner spout which provides flow communication for the grain from the discharging fitting to one of the selected apertures. Consequently, in order to terminate the delivery of grain from one bin or dryer and initiate grain delivery into a different bin or dryer, it is required to disconnect the inner spout from one aperture and reposition this inner spout over a different aperture. This task of raising, rotating and lowering the inner spout presents a significant challenge for elevator operators and has presented such a challenge for quite some time now.

One significant concern with the foregoing style of equipment is how to center the inner spout over a different aperture so that the grain does not spill out into the distributor housing. Since the distributor is typically remote from the operator, for example, it may be located over 100 to 150 feet above ground level, it is quite awkward for the operator to visually ascertain when proper alignment has been achieved. Another important concern with such equipment is the degree of physical exertion required to raise the inner spout and rotate it to an aligned location over a different aperture. In the past, systems have incorporated a pair of chains or ropes and one of these was manipulated by the equipment operator in order to raise the inner spout and the other was utilized in order to rotate this inner spout. However, the weight and dimensions of the inner spout which is involved, especially with large capacity distributors, necessitates considerable manual force in order to lift the entire spout.

One possible solution to the foregoing problem of requiring considerable manual force is afforded by U.S. Pat. No. 4,159,053 issued June 26, 1979 to Edmund P. Taylor and assigned to the assignee of the present invention. This patent discloses an inner spout with a large upper section and a relatively smaller and lighter lower section which is vertically movable relative to the upper section. This arrangement eliminates the necessity of having to apply excessively large manual force to lift the inner spout because it is only necessary to lift the lighter and smaller lower section in order to lift the spout out of a connected orientation with a first aperture. Thereafter, the entire spout assembly may be rotated to the next aperture and the spout lowered.

The arrangement of U.S. Pat. No. 4,159,053 still involves the use of a vertical lifting cable and a separate cable for rotating the inner spout once it has been lifted out of its connected position to the first aperture. These cables must still be manipulated by the operator and while the problem of weight and physical force have been minimized, this disclosed arrangement has its own disadvantages. Manual operation of the cable requires that the operator be positioned at a precise location relative to the cables and there is still the inability to ascertain when proper alignment with an aperture has been achieved. Consequently, it would be an improvement to this type of grain distributor to automate the entire lifting, rotating and lowering cycle as well as provide a means of enhancing alignment and indicating over which aperture the inner spout is positioned for the delivery of grain.

The present invention provides each of these improvements as well as other advantages and benefits as will be apparent from the following descriptions. The electromechanical arrangement of the present invention, although quite suitable for use with multi-section inner spouts, is equally applicable to single-piece inner spouts because manual lifting force is not required. The concerns which resulted in the multi-section inner spout design are no longer relevant factors when an automated design is employed.

SUMMARY OF THE INVENTION

An automatic distributor suitably arranged for interfacing between a material source location and a plurality of remote delivery locations includes a distributor housing having a material inlet and a bottom plate with a plurality of delivery apertures disposed therein, the delivery apertures being suitably arranged for connection to the remote delivery locations, an inner spout disposed within the material distributor housing and coupled at one end to the material inlet, the opposite end being selectively positionable into flow communication with one of the delivery apertures, and means for moving the inner spout from a position of flow communication with one of the plurality of delivery apertures to a position of flow communication with a different one of the plurality of delivery apertures, wherein the moving means includes an eccentric plate which is suitably arranged to initiate movement of the inner spout.

One object of the present invention is to provide an improved material distributor.

Related objects and advantages of the present invention will be apparent from the following description.

DESCRIPTION OF THE PREFERRED EMBODIMENT

Figure 1:
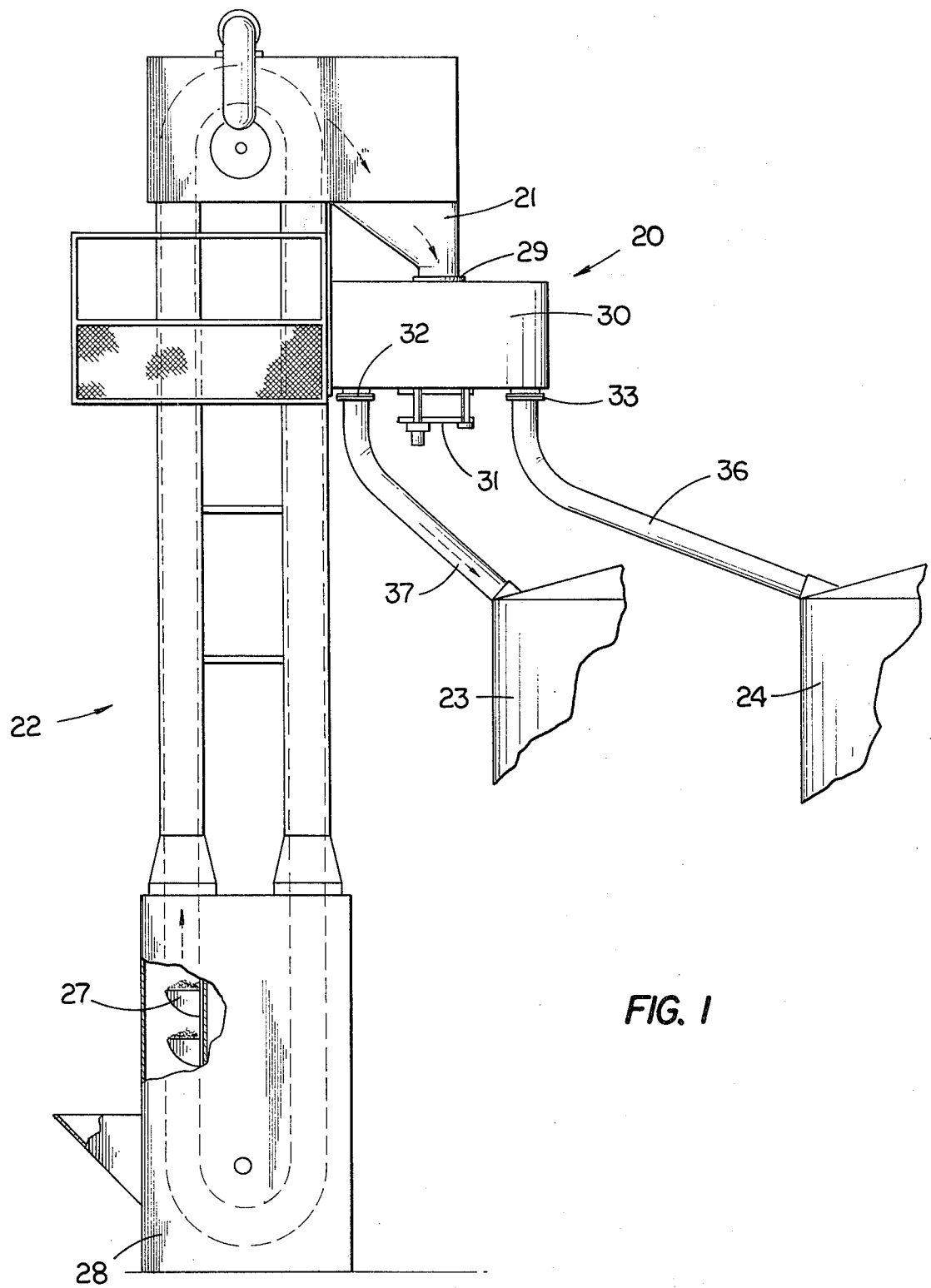
FIG. 1 is a fragmentary front elevation view of a grain elevator to which an automatic grain distributor is attached according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an automatic grain distributor 20 which is positioned between the discharge fitting 21 of a bucket elevator 22 and remote delivery locations which are diagrammatically illustrated at 23 and 24. Location 23 may be, for example, a grain storage bin and 24 may be, for example, a grain dryer.

It is to be noted that the exemplary embodiment detailed herein refers to a grain elevator and the invention is described as a grain distributor. While it is believed that one very appropriate application for the invention is with a grain elevator, the structure to be described and claimed is certainly not limited to grain. The present invention finds important and beneficial applicability in the transfer of any particulate material from a delivery location to a selected one of a plurality of remote locations.

U.S. Pat. No. 4,159,053 issued June 26, 1979 to Edmund P. Taylor discloses the details of a bucket elevator and certain of the operational characteristics of grain elevators and grain distributors generally. This particular patent reference is believed applicable for its background discussion and disclosure regarding the general nature of grain elevators and bucket elevators and is hereby incorporated by reference for that background disclosure. It is to be pointed out, however, that not all of the specific features of the grain distributor of this patent reference are to be incorporated for in fact, it is the design of certain aspects of the presently disclosed grain distributor which clearly distinguishes the present invention from this referenced patent.

As the grain is scooped up by buckets 27 from grain hopper 28, it is carried across the uppermost pulley by a conveyor belt at a relatively high rate of speed. As these grain buckets (cups) pass over this uppermost point and begin their downward travel, the grain contained within these grain buckets is thrown out of the buckets due to centrifugal force. Emptying of the grain from the buckets is enhanced by the geometry of these grain buckets. The grain being discharged from the buckets is directed into discharging fitting 21 which generally has a funnel shape and is coupled to grain distributor inlet 29. The automatic grain distributor includes an enclosure or distributor housing 30 and inlet 29 is positioned in the top surface of this housing. Attached to the bottom surface of housing 30 is an electromechanical control module 31 which cooperates with certain of the internal structural components located within housing 30 to effect the raising, rotating and lowering of an inner spout member which provides the grain flow communication from inlet 29 to a selected outlet flow aperture such as, for example, aperture 32 or 33. The bottom surface plate of distributor housing 30 is arranged into a manifold type of configuration and includes a plurality of such apertures. Each flow aperture is coupled by a different conduit 36, 37 to a corresponding storage bin or dryer, respectively. It is to be understood that the FIG. 1 illustration only shows two such apertures and two such flow connection conduits, but as will be described hereinafter, there may be as many as ten or twelve flow apertures disposed within the bottom surface manifold plate of distributor housing 30. Such pluralities of flow apertures are typically arranged in an evenly spaced (radially) manner about a center axis or pivot location so that the degree or extent of rotation of the inner spout in moving from one aperture to the adjacent aperture is equivalent for each pair of apertures.

Figure 2:
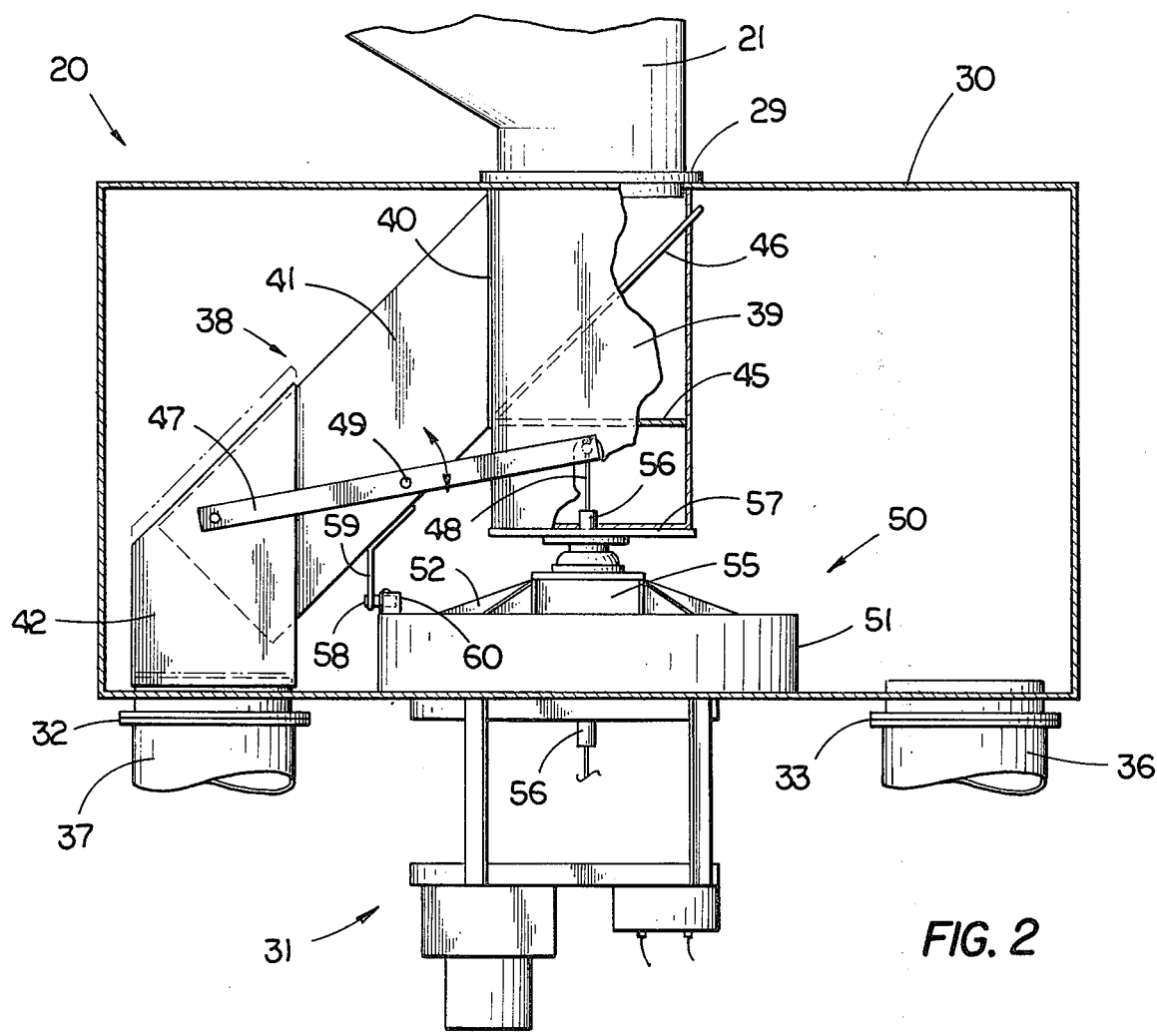
FIG. 2 is a front elevation view of the FIG. 1 automatic grain distributor with portions in full section to show internal features.

Referring to FIG. 2, the interior details of distributor housing 30 are illustrated. Disposed within distributor housing 30 is an inner spout 38 which includes a series of spout sections arranged in a particular relationship to each other in order to provide the functions and operation to be described. Inner spout 38 includes vertical section 39 which is securely coupled to inlet 29 and extends downwardly substantially central to the distributor housing. Inlet 29 and section 39 are configured so as to enable rotation of section 39 about a centerline without becoming disconnected from inlet 29. Vertical section 39 is open at its top surface as well as along edge 49 at which point it connects to intermediate spout section 41. In turn, intermediate spout section 41 is coupled to delivery spout section 42 which is vertically movable relative to section 41. Vertical section 39 is closed at its lower end by plate 45 and deflector plate 46 is positioned on an incline through the interior of section 39 so as to provide a ramp for the flow of grain entering through fitting 21. The grain which enters inlet 29 falls downwardly and strikes deflector plate 46 thereafter being directed into intermediate spout section 41 and from there into delivery spout section 42. Delivery spout section 42 is slidably received over outlet flow aperture 32, yet their degree of overlap is quite small.

In this illustrated orientation, all grain flowing into the grain distributor passes to a selected one of the various flow apertures. However, it is to be understood that delivery spout section 42 may be raised vertically and thereby remove it from any connected or coupled arrangement with the outlet flow aperture. Due to the small degree of overlap, very little vertical movement is needed to "clear" the spout section from the aperture. This vertical movement is effected by means of lift arm 47 and cable 48. By pulling downwardly on cable 48, lift arm 47 pivots in a clockwise direction about pivot point 49 and is configured so as to vertically lift delivery spout section 42 out of flow coupling engagement with outlet flow aperture 32. Thereafter, by other means as will be detailed hereinafter, the entire inner spout 38 may be rotatably indexed to the next flow aperture and the delivery spout section then lowered in place for flow connection by relieving the downward force on the cable.

Also positioned within distributor housing 30 is a distributor base subassembly 50 which includes a generally cylindrical housing 51 and stabilizing or stiffening plates 52. These various plates are welded between center hub 55 and the interior surface of housing 51 in an equally spaced radiating manner. Extending upwardly through the center of center hub 55 is drive shaft 56 and drive plate 57. Plate 57 is securely attached to the bottom surface of vertical section 39 so that there is not permitted any relative movement between these two members. This rigid attachment assures that as plate 57, driven by drive shaft 56, rotates, the entire inner spout 38 also rotates. Drive shaft 56 is hollow thereby permitting cable 48 to pass therethrough. As drive shaft 56 and drive plate 57 generate rotary motion for the inner spout, roller 58 and guide plate 59 provide and additional feature in the form of a positive detent. Roller 58 is oriented about a vertical axis and the bracket 60 supporting roller 58 is rigidly secured to base subassembly 50. There is a roller 58 and associated bracket 60 for each outlet flow aperture disposed within the bottom surface manifold plate of housing 30.

Guide plate 59 is welded to the underside of intermediate spout section 41 and this plate includes a downwardly extending portion which has a recessed detent therein. As drive shaft 56 and plate 57 rotate the inner spout, guide plate 59 moves around housing 51 and after a certain amount of angular rotation, begins to ride across the next roller 58. This roller is disposed relative to the plate so as to snap into the provided detent once the inner spout has been rotated to a point of alignment. This point of alignment is compatibly located with a corresponding aperture in the manifold plate so that at this point of alignment, the inner spout is located over the corresponding outlet flow aperture. This particular feature enables a more accurate alignment and compensation for any dimensional variances which may be present due to tolerance variations incorporated within other components of the system.

Figure 3:
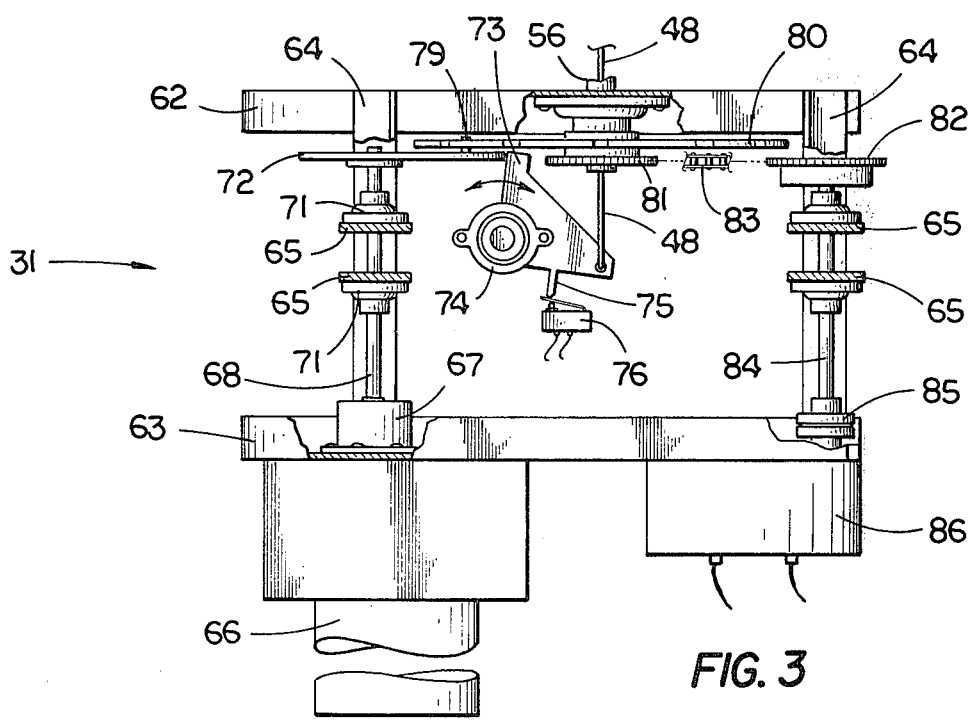
FIG. 3 is a front elevation view in full section of an automatic electromechanical mechanism comprising a portion of the FIG. 1 automatic grain distributor.

Referring to FIG. 3, the internal construction and operation of control module 31 is illustrated. It is control module 31 which generates and provides the rotary driving power for drive shaft 56 and in turn, drive plate 57. It is also control module 31 which provides the vertical force in order to pull downwardly on cable 48 so that delivery spout section 42 can be raised out of connection with the particular flow aperture. It is only after the delivery spout section is disengaged from the particular flow aperture that the entire inner spout can be rotated.

Control module 31 is configured with an interior frame-like construction to which a sheet metal skin may be attached. The detailed specifics of this enclosing structure may be varied so long as a sturdy frame or similar foundation is provided for support of the disclosed components. In the preferred embodiment, a covering skin is not needed due to the fact that protection from the weather is provided to the control module by the distributor housing. Any enclosing panels of sheet metal which one may elect to add have been omitted from this drawing so that the internal frame and component arrangement can be better illustrated. The frame construction of this control module includes a substantially flat top plate 62, a substantially flat bottom plate 63 and four vertically extending end members 64, one located at each corner and providing support and spacing between the top and bottom plates. Extending from front to back on each side from one end member to the corresponding end member are two shaft support plates 65.

Figure 4:
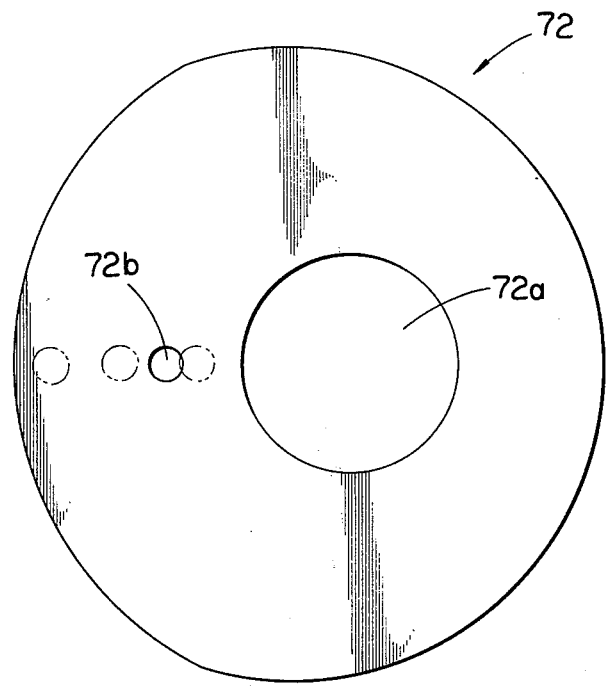
FIGS. 4 and 4A are top plan and side views, respectively, of an eccentric plate comprising a portion of the FIG. 1 automatic grain distributor.
Figure 4A:
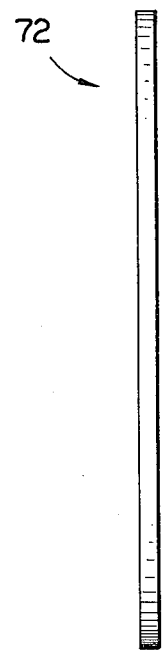

The operation of control module 31 is initiated by a pushbutton control on an operator control panel at ground level (not illustrated) which energizes gearmotor 66. The electrical signals sent by the pushbutton control to the gearmotor initiates its rotary drive action with an RPM rate of approximately 140. Rigidly secured to the structural frame of the control module is a single revolution clutch 67 which is received coaxially on shaft 68. Shaft 68 extends for substantially the full height of control module 31 terminating just short of top plate 62. Intermediately disposed about shaft 68 are two bearing fittings 71 which are secured to and supported by shaft support plates 65. This particular construction maintains true axial alignment and stability for shaft 68. Coupled to the distal end of shaft 68 is an eccentric plate 72 which derives its eccentricity by an off-center pivot point connection to shaft 68. The specific construction of eccentric plate 72 is detailed in FIGS. 4 and 4A. Bore 72a is the point of attachment to shaft 68 and its off-center location results in a different dimension along the diameter from the center of bore 72a to each side. From the illustration of eccentric plate 72 as provided by FIG. 3, it can be seen that as gearmotor 66 and shaft 68 drive eccentric plate 72, there will be a change in the dimension of that plate extending from the rotational axis (center of bore 72a) toward the interior of the control module 31. In the illustrated position, the long side of the eccentric plate is rotated to its most inward orientation and acts against rocker arm 73. Rocker arm 73 pivots about pivotal connector 74 such that as the eccentric plate rotates, a clockwise-counterclockwise oscillatory motion is created in the rocker arm.

One end of rocker arm 73 is arranged for attachment to cable 48 so that as the long side of the eccentric plate pushes against rocker arm 73 causing it to move in a clockwise direction, a downward force is applied on cable 48. Thereafter, as the eccentric plate rotates around to the location where the short side of the eccentric plate is interior to the control module, the rocker arm is free to pivot in a counterclockwise direction. Since cable 48 is coupled to spout section 42, it is the weight of this spout section pulling up on the cable that returns the rocker arm to a somewhat horizontal orientation when not resisted by plate 72. In the illustration of FIG. 3, rocker arm 73 is disposed at its clockwise-most degree of rotation and with cable 48 pulled downwardly, delivery spout section 42 is raised out of any connection with any flow aperture. Due to the very minor vertical movement required to free the inner spout for rotation and the light weight of spout section 42, the driving force on rocker arm 73 by plate 72 is only nominal.

In order to signify that there is an absence of a connection of the inner spout to a flow aperture due to a raised orientation of section 42, a finger 75 is positioned on the bottom edge of rocker arm 73 and acts against the lever arm of a momentary switch 76. Switch 76 is connected to a warning light in order to alert the operator that at that particular point in time the inner spout is in a raised orientation and is not yet lowered onto a flow aperture.

Figure 5:
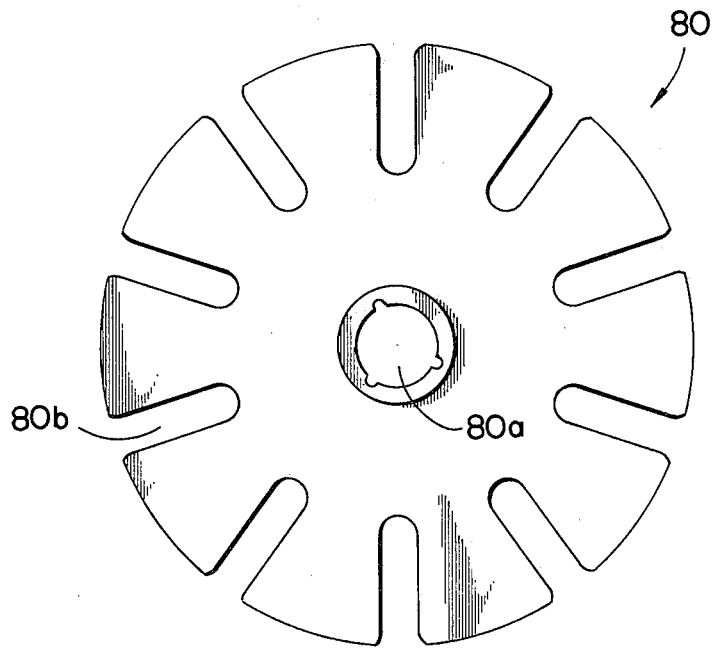
FIGS. 5 and 5A are top plan and side views, respectively, of an indexing plate comprising a portion of the FIG. 1 automatic grain distributor.
Figure 5A:
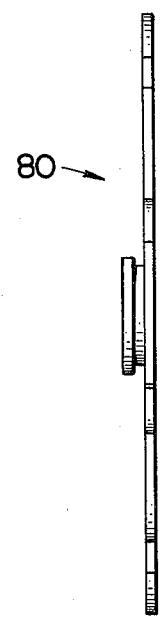

In addition to the off-center point of rotation for eccentric plate 72, there is also included a follower hole 72b and this hole provides a mounting location for a generally cylindrical cam follower. The phantomed holes represent other follower locations and the particular hole location is determined according to the number of apertures in the manifold plate. The hole illustrated in solid line is for a 10-hole plate and 36° indexing of the inner spout. By positioning a follower 79 in the appropriate hole, automatic indexing of the inner spout can be achieved. This follower, while rigidly secured to eccentric plate 72, acts on indexing plate 80 and the mechanical action of follower 79 and indexing plate 80 is similar to that of a geneva mechanism. Indexing plate 80 is rigidly attached to shaft 56 at bore 80a so that as indexing plate 80 turns, shaft 56 turns and the entire inner spout is rotated. FIG. 5 details the indexing plate and illustrates the plurality of slots 80b disposed therein.

As the follower 79 rotates around shaft 68, it travels into one of the plurality of slots 80b disposed in indexing plate 80. As the follower makes engagement with this slot, it acts as a driver to rotate the indexing plate a particular number of degrees. Thereafter, continued rotation of eccentric plate 72 pulls follower 79 out of that particular slot and the indexing plate then remains stationary until the follower returns and picks up the next slot in sequence. Consequently, if there are ten slots, typical of the exemplary embodiment, each slot is located on a different radial line, the lines being 36° apart. Therefore, one complete revolution of eccentric plate 72 results in a 36° movement of indexing plate 80. Similarly, with a different number of slots, all on equal spacing, a different angular travel in indexing plate 80 would be achieved for one revolution of eccentric plate 72. For this reason, it is important to include clutch 67 within the system. Clutch 67 limits the rotation of shaft 68 to one complete revolution with each actuation of the pushbutton control for energizing gearmotor 66. Once this single revolution is completed, the gearmotor is deenergized and the system then awaits the next command by the operator in order to move the inner spout from its then-coupled flow aperture to the adjacent flow aperture.

While the foregoing description has involved the use of a multi-section inner spout, it should be understood that a single-piece spout may be employed with equal success. Since the operator is not involved with the lifting of the spout, weight of the spout is not a major concern. Therefore, a single-piece spout can be employed by merely providing a telescoping fitting at inlet 29 to permit vertical movement and suitable linkages in order to still rely on cable 48 and shaft 56 for the raising and rotating of the spout.

The overall sequence of operation of the control module is as follows. With the inner spout and the delivery spout section slidably coupled over a particular flow aperture, the operator decides that it is time to transfer the delivery of grain from the corresponding particular bin or dryer to a different bin or dryer. The operator then presses the control pushbutton which energizes gearmotor 66. This motor initiates a 140 RPM rate of rotation and moves the larger dimensional side of eccentric plate 72 into contact with rocker arm 73. Continued rotation of eccentric plate 72 drives the rocker arm in a clockwise direction generating a downwardly pulling force on cable 48. This downwardly pulling force on cable 48 in combination with lift arm 47 raises delivery spout section 42 up away from the particular flow aperture with which it was previously in direct flow communication. As this is occurring, yet not until after the spout section has been completely raised, follower 79 is drawn around and into position in a corresponding slot 80b of indexing plate 80. Continued rotation of eccentric plate 72 then drives the follower 79 which drives the indexing plate for a 36° rotation. This then rotates the entire inner spout from its previous flow aperture location to a new location directly above the next (adjacent) flow aperture. As eccentric plate 72 continues to rotate, still not having made one revolution, the follower is drawn out of the slot thereby stopping the rotation of indexing plate 80 and thereafter the longer dimensional side of the eccentric plate travels out of engagement with rocker arm 72, and the weight of spout section 42 raises up on cable 48 returning rocker arm 73 to its prior orientation and lowering delivery spout section 42 over the adjacent flow aperture.

Rigidly coupled to indexing plate 80 is sprocket 81 which in turn is connected to sprocket 82 by timing chain 83. Sprocket 82 is coupled by means of shaft 84 and coupling 85 to position indicator control 86 which is coupled to a visual indicator near ground level. By properly setting these various components initially, position indicator control 86 provides a visual indication to the operator as to over which flow aperture the inner spout is located. With each 36° rotation of indexing plate 80, sprockets 81 and 82 turn a proportionate amount and this then, assuming proper ratios, drives position indicator control 86 to the next mark or number. The operator is thus able to tell at any point in time whether or not the inner spout is raised or lowered and over which particular aperture it is positioned.

Although it is appreciated that a variety of mechanical piece parts and fabrication concepts may be followed, and various shapes and sizes may be incorporated, the basic concept of this invention is believed novel and is desired to be protected. It is envisioned that a variety of mechanical components, different than those selected and detailed herein, may be chosen by others; but all variations of the present concept and theme of this invention are intended to be protected.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An automatic distributor suitably arranged for interfacing between a material source location and a plurality of remote delivery locations, said automatic distributor comprising:
   a distributor housing including a material inlet and a bottom plate, the bottom plate including a plurality of delivery apertures suitably arranged for connection to remote delivery locations;
   an inner spout disposed within said distributor housing and coupled at one end to said material inlet, the opposite end being selectively positionable into flow communication with one of said delivery apertures; and
   means for moving said inner spout from a position of direct flow communication with one of said plurality of delivery apertures to a position of direct flow communication with a different one of said plurality of delivery apertures, said moving means including an eccentric plate suitably arranged to initiate movement of said inner spout from one delivery aperture to said different delivery aperture.

2. An automatic distributor suitably arranged for interfacing between a material source location and a plurality of remote delivery locations, said automatic distributor comprising:
   a distributor housing including a material inlet and a bottom plate, the bottom plate including a plurality of delivery apertures suitably arranged for connection to remote delivery locations;
   an inner spout disposed within said distributor housing and coupled at one end to said material inlet, the opposite end being selectively positionable into flow communication with one of said delivery apertures; and
   means for moving said inner spout from a position of direct flow communication with one of said plurality of delivery apertures to a position of direct flow communication with a different one of said plurality of delivery apertures, said moving means including an eccentric plate suitably arranged to initiate movement of said inner spout from one delivery aperture to said different delivery aperture, said moving means further including a follower driven by said eccentric plate and a lifting linkage cooperatively coupled to said inner spout and to said follower for raising said inner spout.

3. An automatic distributor suitably arranged for interfacing between a material source location and a plurality of remote delivery locations, said automatic distributor comprising:
   a distributor housing including a material inlet and a bottom plate, the bottom plate including a plurality of delivery apertures suitably arranged for connection to remote delivery locations;
   an inner spout disposed within said distributor housing and coupled at one end to said material inlet, the opposite end being selectively positionable into flow communication with one of said delivery apertures; and
   means for moving said inner spout from a position of direct flow communication with one of said plurality of delivery apertures to a position of direct flow communication with a different one of said plurality of delivery apertures, said moving means including an eccentric plate suitably arranged to initiate movement of said inner spout from one delivery aperture to said different delivery aperture, said moving means further including a geneva-style mechanism suitably arranged for sequentially indexing said inner spout from one delivery aperture to another delivery aperture.

4. An automatic gain distributor for providing a grain elevator with a plurality of grain distribution location options, said automatic grain distributor comprising:
   a manifold plate including a plurality of grain delivery apertures, said plurality of grain delivery apertures being suitably arranged for connection to remote grain storage locations;
   means for flow coupling said grain elevator to a selected one of said plurality of grain delivery apertures; and
   means for moving said flow coupling means from one of said plurality of grain delivery apertures to a different one of said grain delivery apertures, said moving means including a geneva-style mechanism for rotatably indexing said flow coupling means.

5. The automatic grain distributor of claim 4 wherein said moving means further includes an eccentric plate and driven follower suitably arranged for raising said flow coupling means.

6. The automatic grain distributor of claim 5 wherein said moving means further includes a motor arranged to rotatably drive said eccentric plate only one revolution with each energizing command delivered to said motor, the combination of said motor, said eccentric plate and said geneva-style mechanism being arranged to provide a sequence of movements for said flow coupling means which include being raised, next rotated and finally lowered.

7. An automatic grain distributor for providing a grain elevator with a plurality of grain distribution location options, said automatic grain distributor comprising:
   a manifold plate including a plurality of grain delivery apertures, said plurality of grain delivery apertures being suitably arranged for connection to remote grain storage locations;
   means for flow coupling said grain elevator to a selected one of said plurality of grain delivery apertures; and
   means for moving said flow coupling means from one of said plurality of grain delivery apertures to a different one of said grain delivery apertures, said moving means including an eccentric plate and driven follower suitably arranged for raising said flow coupling means and an indexing plate for rotatably stepping said flow coupling means from one grain delivery aperture to another grain delivery aperture.

8. An automatic distributor suitably arranged for interfacing between a material source location and a plurality of remote delivery locations, said automatic distributor comprising:
   a distributor housing including a material inlet and a bottom plate, the bottom plate including a plurality of delivery apertures suitably arranged for connection to remote delivery locations;
   an inner spout disposed within said distributor housing and coupled at one end to said material inlet, the opposite end of said inner spout being rotatable and selectively positionable into flow communication with one of said delivery apertures; and
   means for electromechanically moving said inner spout from a position of direct flow communication with one of said plurality of delivery apertures to a position of direct flow communication with a different one of said plurality of delivery apertures, said plurality of delivery apertures being equally radially spaced outwardly of said material inlet, said means for electromechanically moving further includes a geneva-style mechanism suitably arranged for sequentially indexing said inner spout from one delivery aperture to another delivery aperture.

9. The automatic distributor of claim 8 wherein said means for electromechanically moving further includes a follower driven by said eccentric plate and a lifting linkage cooperatively coupled to said inner spout and to said follower for raising said inner spout.

10. The automatic grain distributor of claim 9 wherein said means for electromechanically moving further includes a motor arranged to rotatably drive said eccentric plate only one revolution with each energizing command delivered to said motor, the combination of said motor, said eccentric plate and said geneva-style mechanism being arranged to provide a sequence of movements for said flow coupling means which include being raised, next rotated and finally lowered.

11. The automatic distributor of claim 10 which further includes indicator means cooperatively arranged with said moving means for providing an indication of over which delivery aperture the inner spout is positioned.

12. The automatic distributor of claim 11 which further includes warning means cooperatively arranged with said moving means for indicating when said inner spout is in a raised position.

* * * * *